United States Patent
Pfleger et al.

(10) Patent No.: US 7,925,657 B1
(45) Date of Patent: Apr. 12, 2011

(54) METHODS AND SYSTEMS FOR ADJUSTING A SCORING MEASURE BASED ON QUERY BREADTH

(75) Inventors: Karl Pfleger, Mountain View, CA (US); Brian Larson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1504 days.

(21) Appl. No.: 10/802,958

(22) Filed: Mar. 17, 2004

(51) Int. Cl.
*G06F 7/00* (2006.01)

(52) U.S. Cl. ...................................................... 707/751

(58) Field of Classification Search ........................ 707/3
See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,078,916 A | 6/2000 | Culliss | |
| 6,182,068 B1* | 1/2001 | Culliss | 707/5 |
| 6,185,558 B1* | 2/2001 | Bowman et al. | 707/5 |
| 6,185,559 B1 | 2/2001 | Brin et al. | |
| 6,285,999 B1 | 9/2001 | Page | |
| 6,353,849 B1 | 3/2002 | Linsk | |
| 6,363,378 B1* | 3/2002 | Conklin et al. | 707/5 |
| 6,526,440 B1 | 2/2003 | Bharat | |
| 6,529,903 B2 | 3/2003 | Smith et al. | |
| 6,539,377 B1 | 3/2003 | Cullis | |
| 6,546,388 B1* | 4/2003 | Edlund et al. | 707/5 |
| 6,564,213 B1* | 5/2003 | Ortega et al. | 707/5 |
| 6,567,103 B1 | 5/2003 | Chaudhry | |
| 6,601,061 B1* | 7/2003 | Holt et al. | 707/3 |
| 6,615,209 B1 | 9/2003 | Gomes | |
| 6,658,423 B1 | 12/2003 | Pugh et al. | |
| 6,678,681 B1 | 1/2004 | Brin | |
| 6,721,737 B2* | 4/2004 | Iyengar et al. | 707/751 |
| 6,725,259 B1 | 4/2004 | Bharat | |
| 6,738,764 B2 | 5/2004 | Mao et al. | |
| 6,754,873 B1 | 6/2004 | Law et al. | |
| 6,772,150 B1* | 8/2004 | Whitman et al. | 707/6 |
| 6,853,993 B2 | 2/2005 | Ortega et al. | |
| 6,877,002 B2 | 4/2005 | Prince | |

(Continued)

FOREIGN PATENT DOCUMENTS

WO    WO 00/77689 A    12/2000

(Continued)

OTHER PUBLICATIONS

U.S. Appl. No. 10/661,748, filed Sep. 12, 2003, Tong et al.

(Continued)

*Primary Examiner* — Neveen Abel-Jalil
*Assistant Examiner* — Christyann R Pulliam
(74) *Attorney, Agent, or Firm* — Fish & Richardson P.C.

(57) ABSTRACT

Methods and systems for adjusting a scoring measure of a search result based at least in part on the breadth of a previously-executed search query associated with the search result are described. In one described system, a search engine determines a popularity measure for a search result, and then adjusts the popularity measure based at least in part on a query breadth measure of a previously-executed search query associated with the search result. The search engine may use a variety of query breadth measures. For example, the search engine may use the quantity of results returned by the search query, the length of the query, the IR score drop-off, or some other measure of breadth.

40 Claims, 4 Drawing Sheets

U.S. PATENT DOCUMENTS

| | | | |
|---|---|---|---|
| 6,990,453 | B2 | 1/2006 | Wang et al. |
| 7,249,128 | B2 * | 7/2007 | Chess et al. ................... 707/749 |
| 2002/0042791 | A1 | 4/2002 | Smith et al. |
| 2002/0049752 | A1 * | 4/2002 | Bowman et al. .................. 707/3 |
| 2002/0123988 | A1 | 9/2002 | Dean et al. |
| 2002/0133481 | A1 | 9/2002 | Smith et al. |
| 2003/0037074 | A1 | 2/2003 | Dwork et al. |
| 2003/0120654 | A1 | 6/2003 | Edlund et al. |
| 2003/0135490 | A1 * | 7/2003 | Barrett et al. .................... 707/3 |
| 2003/0229640 | A1 | 12/2003 | Carlson et al. |
| 2004/0059708 | A1 | 3/2004 | Dean et al. |
| 2004/0119740 | A1 | 6/2004 | Chang et al. |
| 2004/0122811 | A1 | 6/2004 | Page |
| 2004/0153472 | A1 | 8/2004 | Rieffanaugh, Jr. |
| 2004/0186828 | A1 | 9/2004 | Yadav et al. |
| 2004/0215607 | A1 | 10/2004 | Travis |
| 2005/0027691 | A1 | 2/2005 | Brin et al. |
| 2005/0033803 | A1 | 2/2005 | Vleet et al. |
| 2005/0060311 | A1 | 3/2005 | Tong et al. |

FOREIGN PATENT DOCUMENTS

| | | |
|---|---|---|
| WO | WO 01/67297 A | 9/2001 |

OTHER PUBLICATIONS

International Search Report-PCT/US2004/029615, Jan. 19, 2005, Google Inc.

International Preliminary Report on Patentability for PCT/US2004/029615, Mar. 23, 2006, Google Inc. et al.

Boyan, J. et al., "A Machine Learning Architecture for Optimizing Web Search Engines," School of Computer Science, Carnegie Mellon University, May 10, 1996, pp. 1-8.

Brin, S. et al., "The Anatomy of a Large-Scale Hypertextual Web Search Engine," WWW7/Computer Networks 30 (1-7): 107-117 (1998).

* cited by examiner

METHODS AND SYSTEMS FOR ADJUSTING A SCORING MEASURE BASED ON QUERY BREADTH

FIELD OF THE INVENTION

The present invention relates generally to methods and systems for information retrieval. The present invention relates particularly to methods and systems for adjusting a scoring measure associated with a search result based on the breadth of a previously-executed search query associated with the search result.

BACKGROUND

A conventional network search engine, such as the Google™ search engine, returns a result set in response to a search query submitted by a user. The search engine performs the search based on a conventional search method. For example, one known method, described in an article entitled "The Anatomy of a Large-Scale Hypertextual Search Engine," by Sergey Brin and Lawrence Page, assigns a degree of importance to a document, such as a web page, based on the link structure of the web page. The search engine ranks or sorts the individual articles or documents in the result set based on a variety of measures. For example, the search engine often ranks the results based on a popularity measure. The search engine generally places the most popular results at the beginning of the result set.

The popularity measure may comprise one or more individual popularity measures. For example, a search engine may utilize the number of times a particular document has been shown to users, i.e., impression count, as a measure of popularity. A conventional search engine may also use a click count or click-through ratio as a measure of popularity. While these measures provide valuable information about each result, the measures can be insufficient, depending on a variety of factors.

A search engine often retrieves a large number of documents for a broad query. For example, if a user enters a one or two-term query, such as "digital camera," the search engine is likely to return millions of results. Also, many different users may submit this broad query initially when searching about material related to digital cameras. Accordingly, the documents returned by these broad queries are often over-represented in the popularity counts, and the popularity count for each one of these results is artificially high because of the number of broad queries submitted. Also, documents returned in response to broad queries are often more abstract than results returned for more specific queries. The more abstract documents are then over-represented in the popularity counts, whether based on clicks or based on impressions.

The resulting over-representation of documents due to broad queries tends to skew data collected about the users' behavior. When a user views a result set from a very broad query, the user will likely see only a small fraction of the entire result set. Therefore, it is difficult to, for example, determine the popularity of documents in the result set based on the users' response to documents resulting from a broad query.

SUMMARY

Embodiments of the present invention provide methods and systems for adjusting a scoring measure for a search result based at least in part on the breadth of a previously-executed search query associated with the result. In one embodiment, a search engine determines a popularity measure for a search result and adjusts the popularity measure based at least in part on a query breadth measure of a previously-executed search query associated with the search result. The search engine may use a variety of query breadth measures. For example, in one embodiment, the query breadth measure comprises a quantity of results returned by the search query.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention comprise methods and systems for adjusting a scoring measure for a search result based at least in part on the breadth of a previously-executed search query associated with the search result. In one embodiment, a search engine deweights a popularity measure for a result when the value of the popularity measure has been increased as a result of the submission of one or more broad queries. The breadth of the query may be calculated in various ways.

Figure 1:
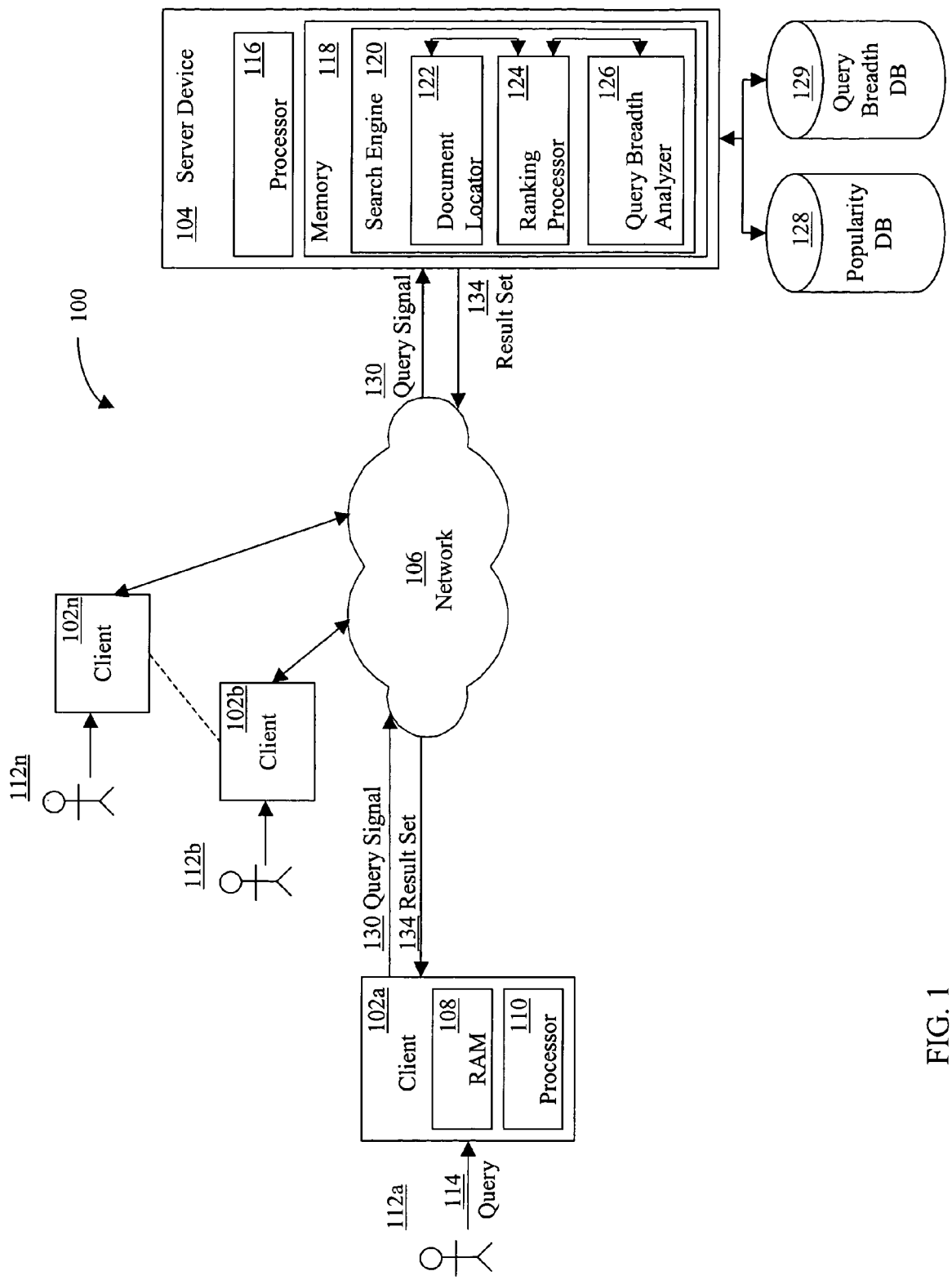
FIG. 1 is a block diagram illustrating an exemplary environment in which one embodiment of the present invention may operate.

Referring now to the drawings in which like numerals indicate like elements throughout the several figures, FIG. 1 is a block diagram illustrating an exemplary environment for implementation of one embodiment of the present invention. The system 100 shown in FIG. 1 includes multiple client devices 102a-n in communication with a server device 104 over a network 106. The network 106 shown includes the Internet. In other embodiments, other wired and wireless networks, such as an intranet may be used. Moreover, methods according to the present invention may operate within a single computer.

The client devices 102a-n shown each includes a computer-readable medium, such as a random access memory (RAM) 108 coupled to a processor 110. The processor 110 executes computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Internet Explorer™ from Microsoft Corporation, Netscape Navigator™ from Netscape Communications Corporation, and Safari™ from Apple Computer, Inc.

Through the client devices 102a-n, users 112a-n can communicate over the network 106 with each other and with other systems and devices coupled to the network 106. As shown in FIG. 1, a server device 104 is also coupled to the network 106. In the embodiment shown, a user 112a-n generates a search query 114 at a client device 102a. The client device 102a transmits the query 114 the server device 104 via the network 106. For example, a user 112a types a textual search query into a query field of a web page of a search engine interface displayed on the client device 102a, which is then transmitted via the network 106 to the server device 104. In the embodiment shown, a user 112a inputs a search query 114 at a client device 102a, which transmits a search query signal 130 associated with the search query 114 to the server device 104. The search query 114 may be transmitted directly to the server device 104 as shown. In another embodiment, the query signal 130 is instead sent to a proxy server (not shown), which then transmits the query signal 130 to server device 104. Other configurations are possible.

The server device 104 shown includes a server executing a search engine application program, such as the Google™ search engine. Similar to the client devices 102a-n, the server device 104 shown includes a processor 116 coupled to a computer-readable memory 118. Server device 104, depicted as a single computer system, may be implemented as a network or cluster of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the search engine application program, also known as a search engine 120. The search engine 120 locates relevant information in response to a search query 114 from a user 112a-n. The search engine 120 then provides the result set 134 to the client 102a via the network 106.

In the embodiment shown, the server device 104, or related device, has previously performed a crawl of the network 106 to locate articles, such as web pages, stored at other devices or systems connected to the network 106, and indexed the articles in memory 118 or on another data storage device. Articles include, for example, web pages of various formats, such as HTML, XML, XHTML, Portable Document Format (PDF) files, and word processor, database, and application program document files, audio, video, or any other documents or information of any type whatsoever made available on a network (such as the Internet), a personal computer, or other computing or storage means. The embodiments described herein are described generally in relation to HTML files or documents, but embodiments may operate on any type of article, including any type of image.

The search engine 120 includes a document locator 122, a ranking processor 124, and a query breadth analyzer 126. In the embodiment shown, each comprises computer code residing in the memory 118. The document locator 122 identifies a set of documents that are responsive to the search query 114 from a user 112n by, for example, accessing an index of documents, indexed in accordance with potential search queries or search terms. The ranking processor 124 ranks or scores the search result 134 including the located set of web pages or documents based upon relevance to the search query 114 or another criteria, such as a popularity measure. The query breadth analyzer 126 determines or otherwise measures the breadth of the query associated with the query signal 130. Note that other functions and characteristics of the document locator 122, ranking processor 124, and query breadth analyzer 126 are further described below.

Server device 104 also provides access to other storage elements, such as a popularity database 128 and a query breadth database 129. The server device 104 can access other similar types of data storage devices. The popularity database 128 stores measures of the popularity of a document. The popularity database 128 may contain either or both query-dependent and query-independent popularity measures. For example, the popularity database 128 may store the number of times a particular document has been shown to users—a query-independent measure. Alternatively or additionally, the popularity database 128 may store the number of times that the article has been shown to a user in response to a particular keyword—a query-dependent measure. The ranking processor 124 utilizes this information in performing rankings of pages in the result set 134. When the search engine 120 generates a result set 134, the search engine 120 causes a record to be added or modified in the popularity database 128 to indicate that a particular result was shown to a user 112a in a result set 134.

Other measures of popularity may be stored in the popularity database 128, including, for example, click-through data. Click-through data is generally an indicator of quality in a search result. Quality signals or click-through data can include, but is not limited to, whether a particular URL or document is clicked by a particular user; how often a URL, document, or web page is clicked by one or more users; how often a particular user clicks on specific documents or web pages; and the ratio of how often a URL, document, or web page is clicked by one or more users to the number of times the URL, document or web page is shown to one or more users (known also as the click-through ratio). A popularity database 128 or similar data storage devices can store other types of quality signals similar to click-through data, such as any quantitative measure of user behavior.

Other data related to documents located in a search result 134 that can be stored in a popularity database 128 or other data storage device can include, but is not limited to, how often a particular URL, document, or web page is shown in response to a search query 114; how many times a particular search query 114 is asked by users 112; the age or time a particular document has been posted on a network 106, and the identity of a source of a particular document on a network 106.

The query breadth database 129 stores measures of query breadth. Various measures of query breadth may be stored. For example, one measure of query breadth is the number of results matching a query. The higher the number of results, the more likely the query is a broad one.

Another measure of query breadth is the rate at which the information retrieval (IR) score drops off from a first result until a second result, e.g., the first result until the nth result. The terms first and second are used here merely to differentiate one item from another item. The terms first and second are not used to indicate first or second in time, or first or second in a list, or other order, unless explicitly noted. The IR score provides a measure of the relevance of a document for a query. If many documents are returned in response to a query, many of them are likely relevant to the query and will have a correspondingly high IR score. Accordingly, the IR score will drop slowly from one result to the next result in the result set. The slower the rate of drop off, the more likely the query is a broad query. For example, if a query returns one million results, the drop off in IR score from the first element ($IR_1$) to the tenth element ($IR_{10}$) is likely very small. In other words, the tenth document is likely to be nearly or just as relevant to the query as the first result. In contrast, if a query returns only ten results, the drop off in IR score from the first element to the tenth element is likely to be very high.

The drop off in IR score may be stored in the query breadth database 129 as a ratio, for example, $IR_{10}/IR_1$. The breadth of the query is assumed to be highest as the ratio approaches 1, where the relevance of the first and tenth queries are most nearly equal. The breadth is assumed to be lowest as the ratio approaches 0. Another related measure of query breadth is number of results in a result set that have an IR score greater than a percentage of the top IR score, e.g., an IR score greater than about ninety percent (90%) of the top IR score.

It should be noted that embodiments of the present invention may comprise systems having different architecture than that which is shown in FIG. 1. For example, in some systems according to the present invention, server device 104 may comprise multiple physical servers. The system 100 shown in FIG. 1 is merely exemplary, and is used to explain the exemplary methods shown in FIGS. 2 and 3.

Various methods may be implemented in the environment shown in FIG. 1 and other environments according to the present invention. For example in one embodiment, a user 112a enters a search query 114. In response, to receiving the associated query signal 130, a search engine 120 locates documents to return in a result set 134. Before returning the result set 134, the search engine 120 ranks the results. The search engine 120 may sort or rank the results using a popularity measure. In one embodiment, the search engine 120 determines a ranking measure, such as a popularity measure, for a search result in response to the current query. The ranking measure may be or may have been adjusted based at least in part on a query breadth measure of a previously-executed search query associated with the search result. In one embodiment, the adjustment is based on the query breadth measures of a plurality of previously-executed search queries associated with the search result.

The search engine 120 may also use measures associated with the search query, rather than the number of results returned, to measure the breadth of the search query. For example, in one embodiment, the search engine 120 determines the quantity of search terms in a search query. The fewer the quantity of terms in a search query, the broader the query is likely to be. In another embodiment, the search engine 120 determines how frequently a specific search query is used. The higher the frequency of search query use, the broader the query is likely to be. For example, many users 112a-n are likely to enter a broad query, such as "digital camera." Accordingly, the frequency of use of the query "digital camera" is high.

The search engine 120 may adjust any popularity measure based on the query breadth measure. The popularity measure that is adjusted may be a query dependent or query independent measure. A popularity measure that is query independent is a measure of absolute popularity. For example, in one embodiment, a click-through ratio is query dependent since it takes into account the number of times the result is shown to a user 112a as a result of a search query 114. In contrast, the click count is query independent since it is purely based on the number of times an article is clicked.

Figure 2:
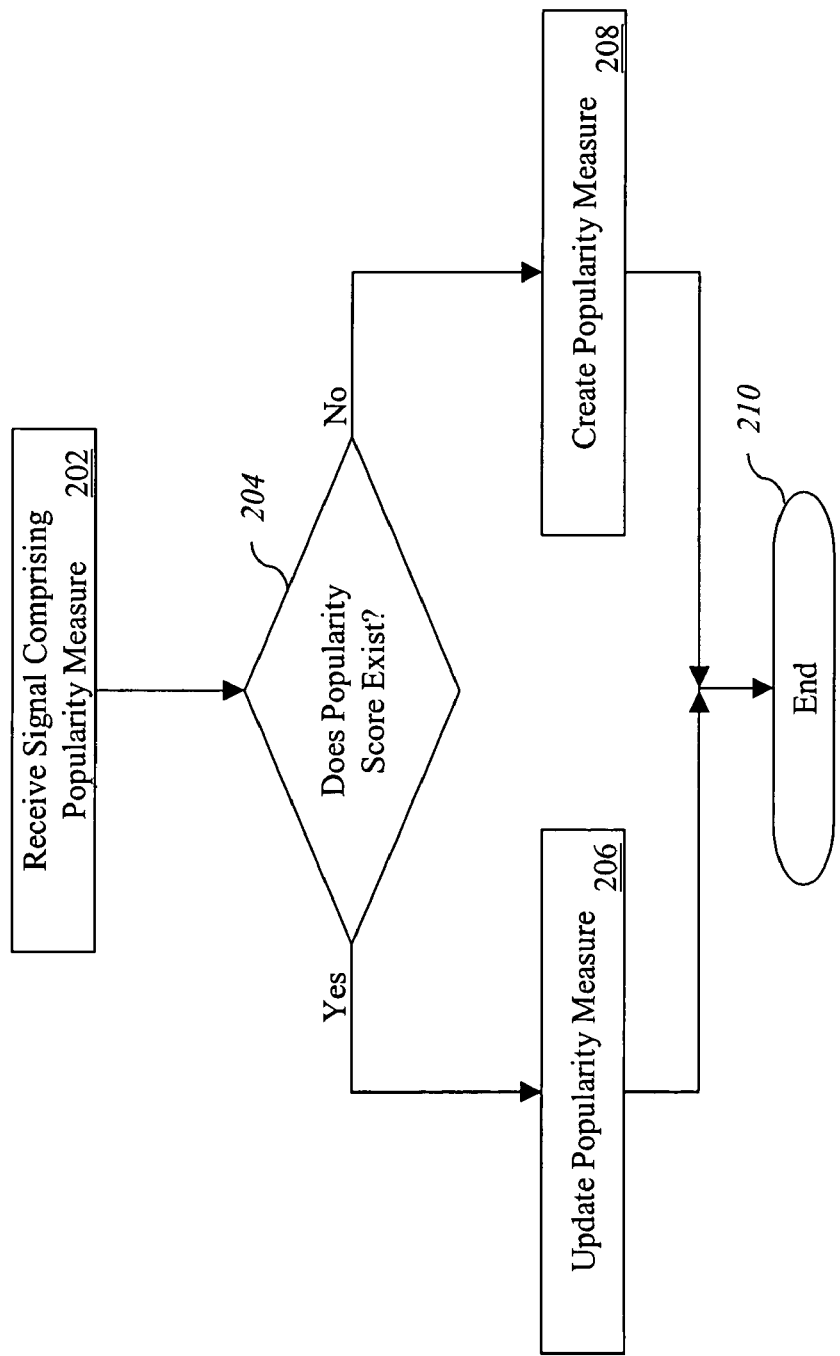
FIG. 2 is a flowchart illustrating a process for associating a popularity measure with a search result in one embodiment of the present invention.

FIG. 2 is a flowchart illustrating a process for associating a popularity measure with a search result in one embodiment of the present invention. In the embodiment shown, the search engine 120 receives a signal comprising a result, such as an article, and a popularity measure associated with the result at 202. The search engine 120 or other component determines whether or not a popularity measure has been associated with the result by, for example, searching the popularity database (128) at 204.

If the popularity measure exists for the result, the search engine 120 updates the popularity measure, e.g., the search engine may increment a click count associated with a search result at 206. If the popularity measure does not exist, the search engine 120 creates a popularity measure/result association in the popularity database (128) at 208. The process shown in FIG. 2 then ends at 210. The popularity measure can be used in subsequent searches to rank a result returned in response to a search query. The updates to the popularity database 128 may occur offline so that a user is not affected adversely by the storing or updating of the popularity measure.

Figure 3:
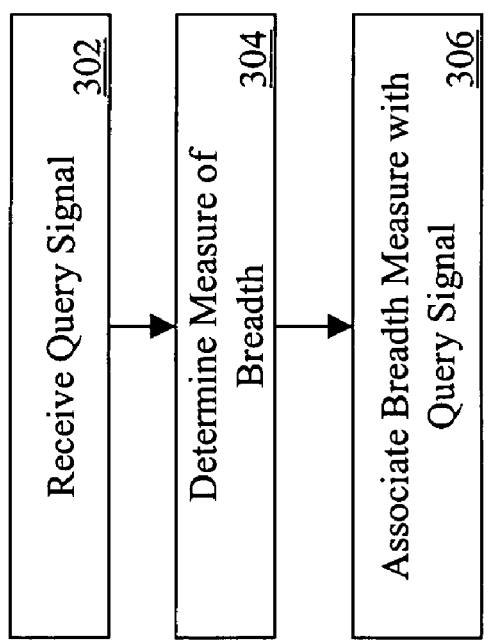
FIG. 3 is a flowchart illustrating a process for associating a query breadth measure with a search query in one embodiment of the present invention.

FIG. 3 is a flowchart illustrating a process for associating a query breadth measure with a search query in one embodiment of the present invention. In the embodiment shown, the query breadth analyzer 126 receives a query signal at 302. In response, the query breadth analyzer determines the breadth of the query at 304. The query breadth analyzer 126 may determine the breadth of the query by various methods. For example, in one embodiment, the breadth of the query is determined as the ratio of the IR score of the tenth result returned by the query divided by the IR score of the first result returned by the query. In another embodiment, the breadth of the query is determined by evaluating the number of results that are returned by the query. A higher number indicates a broader query.

In one embodiment, the query breadth analyzer 126 receives the information retrieval (IR) score of the first result ($IR_1$) of the query. The query breadth analyzer 126 also receives the IR score of the nth result ($IR_n$) of the query. In the embodiment shown in FIG. 3, the variable n is set based on previously observed results from queries that are determined in some way to be broad or narrow. The value of n is set to represent the number of results expected from a relatively narrow query. A higher value of n will result in a fewer number of queries being classified as broad, i.e., a fewer number of queries having a slow IR drop rate. In the embodiment shown, n equals 10. The query breadth analyzer 126 next computes the ratio of $IR_n$ to $IR_1$ ($IR_n/IR_1$) to arrive at a query breadth measure. To de-weight a result, the computed ratio is subtracted from 1 and multiplied by the popularity measure.

If the IR score for the query drops off slowly, $IR_n$, will be nearly equal to $IR_1$. Accordingly, the ratio of $IR_n$, to $IR_1$ will approach 1 and the result of subtracting the ratio from 1 will approach 0. When the popularity measure is multiplied by 1 minus the breadth measure as shown in the embodiment illustrated in FIG. 4, the popularity measure will be reduced, i.e., deweighted. Accordingly, results that have unnecessarily high popularity measures as a result of an association with one or more broad queries will be rated less highly in result sets. The query breadth analyzer 126 next associates the measure of breadth with the query, e.g., the query breadth analyzer 126 stores the association in the query breadth database (129) at 306.

Embodiments of the present invention may utilize query-dependent or query-independent measures for determining the popularity of a result. A query-dependent measure is a measure of popularity that is dependent on the query that returned a result. A query-independent measure provides a measure of absolute popularity for a result, regardless of the context in which the user is presented the result. For example, one embodiment utilizes the click-through ratio for a page to determine the granularity of a page. A very low click-through ratio implies that a result is retrieved in response to many broad queries but is not particularly relevant to users' questions. Accordingly, when the ratio of clicks to impressions is very low, one such embodiment deweights the popularity measure based on the impressions. In another embodiment, the click count is utilized as the measure of popularity. The click count simply measures the number of times an article is clicked without reference to the number of times the article is shown to the user 112a.

An embodiment of the present invention may utilize a variety of measures of query breadth that are not directly related to the actual results. Such measures imply the breadth of the query. For example, in one embodiment, a simple measure of breadth, the number of terms used in the search query, provides the measure of query breadth. In general, the fewer the number of terms in the query, the broader the query is. In one such embodiment, the search engine 120 calculates the ratio of the length of the query to the average length of search queries. The lower the ratio, the broader the query.

In another embodiment of the present invention, the search engine 120 determines the number of times that the exact or almost exact search query has been issued by users 112a-n. The higher the frequency, the more likely the query is to be a broad query. The length of the search query and the frequency of submission of the search query imply that the queries are broad. However, a query may be short or frequent and still relatively narrow. For example, many users may issue a query for a unique surname that has been present in the media. These queries may result in a small number of documents in the result set 134. Therefore, in various embodiments of the present invention, multiple measures of query breadth are combined to determine the breadth of the query and adjust the popularity measure for the search query.

Figure 4:
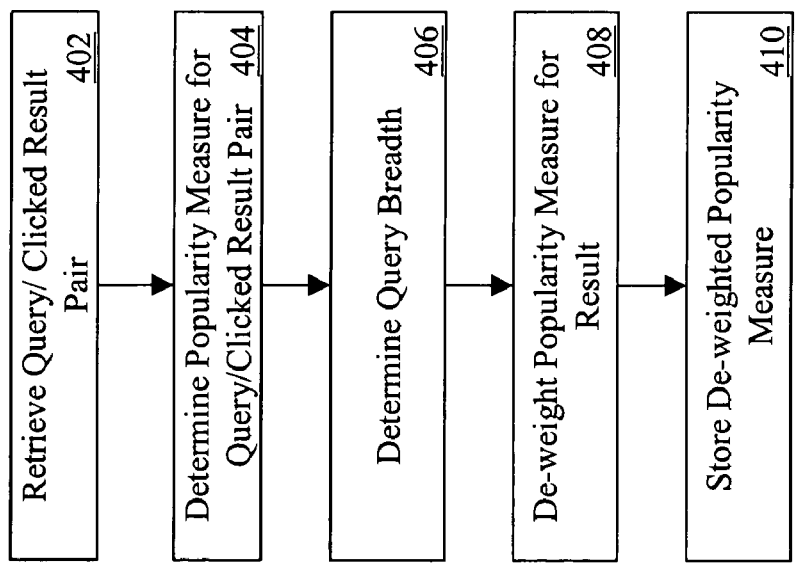
FIG. 4 is a flowchart illustrating a method for adjusting the popularity measure of a result in one embodiment of the present invention.

FIG. 4 is a flowchart illustrating a method for adjusting the popularity measure of a result in one embodiment of the present invention. In the embodiment shown, the query breadth analyzer 126 retrieves a record from a log file or other data store that comprises a search query and an identifier of a result that was clicked at 402. The query breadth analyzer 126 then determines a popularity measure for the pair at 404. For example, for a click count, the query breadth analyzer 126 determines how many occurrences of the query/clicked result pair are in the log. The number of occurrences corresponds to the number of times the result was clicked after being retrieved in response to the query. The total number of clicks for the result is a popularity measure corresponding to the search query.

The query breadth analyzer 126 next determines the breadth of the query at 406. The query breadth analyzer 126 uses the breadth of the query to de-weight the popularity measure corresponding to the search query at 408. The query breadth analyzer 126 stores the de-weighted popularity measure in a data store at 410. The query breadth analyzer 126 or other component may repeat the exemplary process shown in FIG. 4 numerous times. For example, the process shown may be repeated for each pair of query/clicked result found in the data store and/or for each popularity measure.

For example, in one embodiment, a user 112a enters a search query 114 comprising the terms "digital camera." The client 102a converts the textual search query 114 into a query signal 130 and transmits the query signal 130 over the network 106 to the server device 104. The server device 104 executes the search engine 120 and passes the query signal 130 to the search engine 120. The search engine 120 locates several million documents satisfying the query, "digital camera," which indicates that the query is a broad query. The query breadth analyzer 126 stores the query, "digital camera," along with the count of the number of results returned in response to the query in the query breadth database 129. Since the query is broad, many users are likely to enter the same query. The number of times the same query is executed may also be stored in the query breadth database 129.

In an attempt to narrow the result set, the user 112a subsequently enters a search query 114 comprising the terms "canon powershot digital camera." The client 102a converts the textual search query 114 into a query signal 130 and transmits the query signal 130 over the network 106 to the server device 104. The server device 104 executes the search engine 120 and passes the query signal 130 to the search engine 120. The search engine 120 locates several hundred thousand documents satisfying the query. The query breadth analyzer 126 stores the query and the count of the results returned in response to the query in the query breadth database 129. Since the subsequent query returns a smaller number of results, the breadth of the query as measured by the number of documents returned for the query "canon powershot digital camera" is smaller than the breadth of the query "digital camera."

In, for example, a nightly batch process executed after the two queries described above have been submitted, the ranking processor 124 adjusts the popularity or other ranking measure of a result associated with the previously-executed search queries based on the number of results returned in response to each of the two queries. Although, in the example described, the adjustment is based on only two queries, often, the adjustment is based on a large number of queries.

Since many of the documents resulting from the broadest exemplary query, "digital camera," will have been shown many times to many users, the documents are likely to have high popularity measures. However, the popularity measure is artificially high; the score would not be as high if not for the execution of the broad queries. Accordingly, the query breadth analyzer 126 deweights the popularity measures for these documents.

The adjustment may be based solely on the query breadth measure or may be based only in part on the query breadth measure. For example, the ranking processor may also utilize the age of the popularity data in making the adjustment. Once the popularity measure of the results have been adjusted.

Subsequently, a user enters another search query, e.g., "canon powershot digital camera Atlanta." The search engine 122 executes the search query and retrieves search results. The ranking processor 124 uses the deweighted popularity measures to sort the results, and the search engine 120 transmits the sorted result set 134 to the client 102*a*

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed is:

1. A method comprising:
   estimating, by a server device implemented as a single computer system or as a network or cluster of computer processors, a breadth of a search query;
   identifying user interaction with a first document in a result set that is responsive to the search query;
   changing, by the server device, a ranking of a popularity of the first document based at least in part on the user interaction with the first document and the breadth of the search query, wherein an amount of the change in the ranking of the popularity decreases with increased breadth of the search query; and
   making, by the server device, the ranking of the popularity of the first document available for responding to a subsequent search query.

2. The method of claim 1, wherein estimating the breadth of the search query comprises estimating the breadth based on a total number of documents in a result set that is responsive to the search query.

3. The method of claim 1, wherein estimating the breadth of the search query comprises estimating the breadth of the search query based on differences in relevances of documents in the result set.

4. The method of claim 1, wherein estimating the breadth of the search query comprises comparing rates at which the documents in the result set are retrieved.

5. The method of claim 1, wherein changing the ranking of the popularity of the first document comprises weighting the user interaction with the first document based on the breadth of the search query.

6. The method of claim 5, wherein changing the ranking of the popularity of the first document further comprises adding the weighted user interaction to a popularity database configured to store measures of a popularity of documents.

7. The method of claim 1, wherein identifying user interaction with the first document comprises determining a click count for the first document.

8. The method of claim 1, wherein identifying user interaction with the first document comprises determining a click-through ratio for the first document.

9. The method of claim 1, wherein identifying the user interaction with the first document comprises identifying the user interaction independent of a search query.

10. The method of claim 1, further comprising responding, by the server device, to a subsequent search query based at least in part on the ranking of the popularity of the first document.

11. The method of claim 10, wherein responding to the subsequent search query comprises adjusting a ranking of documents in the response to the subsequent search query based at least in part on the ranking of the popularity of the first document.

12. The method of claim 1, wherein changing the ranking of the popularity of the first document comprising increasing the ranking of the popularity of the first document.

13. An article comprising one or more machine-readable data storage media storing instructions operable to cause one or more machines to perform operations comprising:
    estimating a breadth of a search query;
    identifying user interaction with a first document in a result set that is responsive to the search query;
    changing a ranking of a popularity of the first document based at least in part on the user interaction with the first document and the breadth of the search query, wherein an amount of the change in the ranking of the popularity decreases with increased breadth of the search query; and
    making the ranking of the popularity of the first document available for responding to a subsequent search query.

14. The article of claim 13, wherein estimating the breadth of the search query comprises estimating the breadth based on a total number of documents in a result set that is responsive to the search query.

15. The article of claim 13, wherein estimating the breadth of the search query comprises estimating the breadth of the search query based on differences in relevances of documents in the result set.

16. The article of claim 13, wherein estimating the breadth of the search query comprises comparing rates at which the documents in the result set are retrieved.

17. The article of claim 13, wherein changing the ranking of the popularity of the first document comprises weighting the user interaction with the first document based on the breadth of the search query.

18. The article of claim 17, wherein changing the ranking of the popularity of the first document further comprises adding the weighted user interaction to a popularity database configured to store measures of a popularity of documents.

19. The article of claim 13, wherein identifying user interaction with the first document comprises determining a click count for the first document.

20. The article of claim 13, wherein identifying user interaction with the first document comprises determining a click-through ratio for the first document.

21. The article of claim 13, wherein identifying the user interaction with the first document comprises identifying the user interaction independent of a search query.

22. The article of claim 13, further comprising responding to a subsequent search query based at least in part on the ranking of the popularity of the first document.

23. The article of claim 22, wherein responding to the subsequent search query comprises adjusting a ranking of documents in the response to the subsequent search query based at least in part on the ranking of the popularity of the first document.

24. The article of claim 13, wherein changing the ranking of the popularity of the first document comprising increasing the ranking of the popularity of the first document.

25. A system comprising:
a server device implemented as a single computer system or as a network or cluster of computer processors, the server device programmed to perform operations, the operations comprising:
estimating a breadth of a search query;
identifying user interaction with a first document in a result set that is responsive to the search query;
changing a ranking of a popularity of the first document based at least in part on the user interaction with the first document and the breadth of the search query, wherein an amount of the change in the ranking of the popularity decreases with increased breadth of the search query; and
making the ranking of the popularity of the first document available for responding to a subsequent search query.

26. The system of claim 25, wherein the server device executes a search engine application program.

27. The system of claim 25, wherein the system further comprises:
a data communication network coupled to the server device; and
a data processing device programmed to transmit the search query over the data communication network to the server device.

28. The system of claim 27, wherein the data processing device comprises a client device with a search engine interface having a query field..

29. The system of claim 27, wherein the data processing device comprises a proxy server.

30. The system of claim 27, wherein estimating the breadth of the search query comprises estimating the breadth based on a total number of documents in a result set that is responsive to the search query.

31. The system of claim 27, wherein estimating the breadth of the search query comprises estimating the breadth of the search query based on differences in relevances of documents in the result set.

32. The system of claim 27, wherein estimating the breadth of the search query comprises comparing rates at which the documents in the result set are retrieved.

33. The system of claim 27, wherein changing the ranking of the popularity of the first document comprises weighting the user interaction with the first document based on the breadth of the search query.

34. The system of claim 33, wherein changing the ranking of the popularity of the first document further comprises adding the weighted user interaction to a popularity database configured to store measures of a popularity of documents.

35. The system of claim 27 wherein identifying user interaction with the first document comprises determining a click count for the first document.

36. The system of claim 27, wherein identifying user interaction with the first document comprises determining a click-through ratio for the first document.

37. The system of claim 27, wherein identifying the user interaction with the first document comprises identifying the user interaction independent of a search query.

38. The system of claim 27, wherein the operations further comprise responding to a subsequent search query based at least in part on the ranking of the popularity of the first document.

39. The system of claim 38, wherein responding to the subsequent search query comprises adjusting a ranking of documents in the response to the subsequent search query based at least in part on the ranking of the popularity of the first document.

40. The system of claim 27, wherein changing the ranking of the popularity of the first document comprising increasing the ranking of the popularity of the first document.

* * * * *

UNITED STATES PATENT AND TRADEMARK OFFICE
CERTIFICATE OF CORRECTION

| | | |
|---|---|---|
| PATENT NO. | : 7,925,657 B1 | Page 1 of 1 |
| APPLICATION NO. | : 10/802958 | |
| DATED | : April 12, 2011 | |
| INVENTOR(S) | : Pfleger et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,755 days.

Signed and Sealed this
Twenty-second Day of November, 2011

David J. Kappos
*Director of the United States Patent and Trademark Office*